Figure 1:
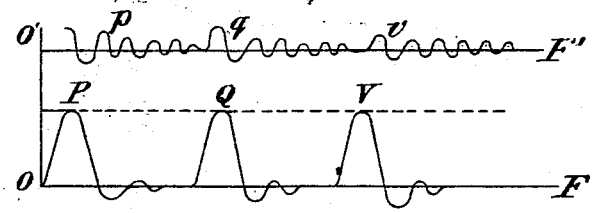

No. 824,682. PATENTED JUNE 26, 1906.
A. BLONDEL.
METHOD OF PRACTICING WIRELESS TELEGRAPHY.
APPLICATION FILED FEB. 7, 1905.

2 SHEETS—SHEET 1.

Mech. tuned receiving devices

Witnesses:
D. W. Edelin
F. T. Chapman

Inventor:
André Blondel.
By Lyons & Bising
Attorneys.

No. 824,682.  PATENTED JUNE 26, 1906.
A. BLONDEL.
METHOD OF PRACTICING WIRELESS TELEGRAPHY.
APPLICATION FILED FEB. 7, 1905.
2 SHEETS—SHEET 2.
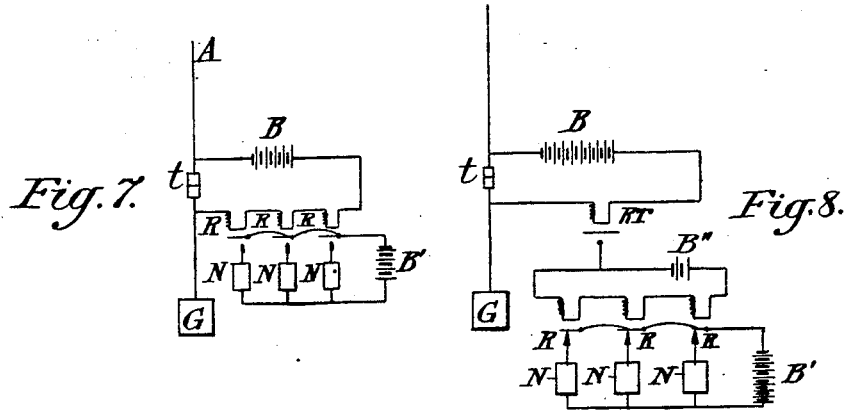
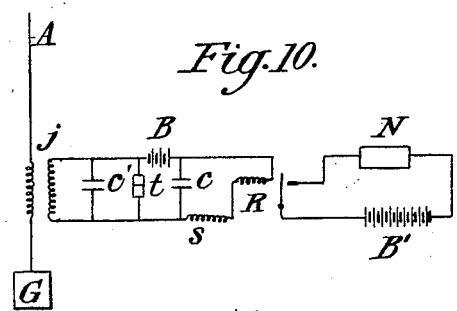
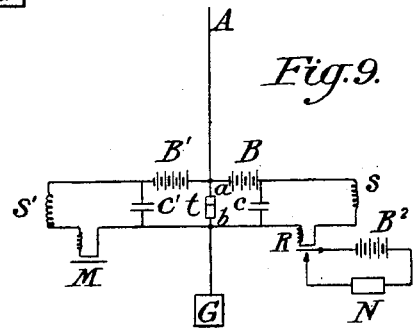
Witnesses:
O. W. Edwin.
F. T. Chapman
Inventor:
André Blondel
By Lyons & Bissing
Attorneys.

UNITED STATES PATENT OFFICE.

ANDRÉ BLONDEL, OF PARIS, FRANCE.

METHOD OF PRACTICING WIRELESS TELEGRAPHY.

No. 824,682.          Specification of Letters Patent.          Patented June 26, 1906.

Original application filed December 3, 1900, Serial No. 38,539. Divided and this application filed February 7, 1905. Serial No. 244,584.

*To all whom it may concern:*

Be it known that I, ANDRÉ BLONDEL, a citizen of the Republic of France, and a resident of Paris, in the Republic of France, have invented certain new and useful Improvements in Methods of Practicing Wireless Telegraphy, of which the following is a specification.

My invention has reference to improvements in methods of practicing wireless telegraphy, the object of the invention being the selective reception at a given station of a signal or message transmitted from one of a number of transmitting-stations, or the simultaneous selective reception at one station of two or more messages coming from two or more transmitting-stations.

Prior to my invention it has been attempted to accomplish the selective reception at a receiving-station of signals emitted at one of a number of distant transmitting-stations, by electrically tuning the receiving mast-wire in unison with the periodicity of the electromagnetic waves emitted at such transmitting-station. The difficulties encountered in such systems are now well recognized, and they can mainly be traced to the fact that it is practically impossible to obtain accurate syntony between two mast-wires, because of the enormous frequency of the electromagnetic waves emitted by one and to be selectively absorbed by the other.

In accordance with my invention syntony between the transmitting and receiving mast-wires is not aimed at and is not utilized, the mast-wires being practically aperiodic, so that they will emit or absorb, without selection, electromagnetic waves of all frequencies.

My improved method, in its broadest aspect, may be briefly described as follows:

I produce at the sending station or stations electromagnetic waves by sharply-defined disruptive electrical discharges, which follow each other with a predetermined moderate frequency, which is different at each transmitter. Each of these discharges gives rise to a number of electromagnetic waves of very high frequency, which are propagated through space and are absorbed, without selection, by the aperiodic receiving mast-wire; and I cause groups of electrical impulses, corresponding to the groups of these waves (as distinguished from the waves themselves) to actuate or control the signal-receiving devices, each receiving device by groups of a different frequency.

This invention I can realize in a variety of ways. Thus for instance, I may at the receiving-station transfer the energies of the absorbed waves, without selection, to a receiving-circuit, and cause them to actuate or control, selectively, signal-receiving devices, each device with one of the group frequencies of the absorbed waves; or I may transfer the energies of absorbed waves in selected groups to a receiving circuit or circuits, and cause these group energies to actuate each a signal-receiving device, with or without selection; or, finally, I may selectively transfer the energies of the absorbed waves of a selected frequency to one circuit, and from there selectively transfer the energies of the differently-timed groups of waves, each to another circuit, and cause the latter energies to actuate or control signal-receiving devices each at the rate of one of the selected groups, with or without selection.

Figure 2:
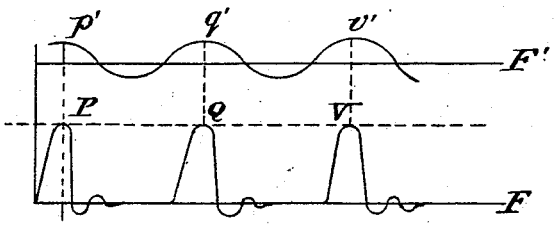
Figure 3:
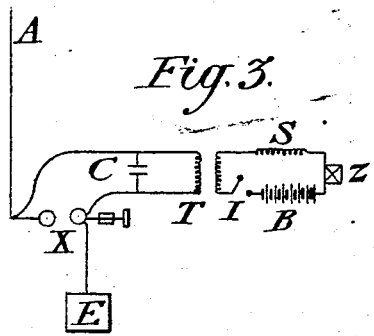
Figure 4:
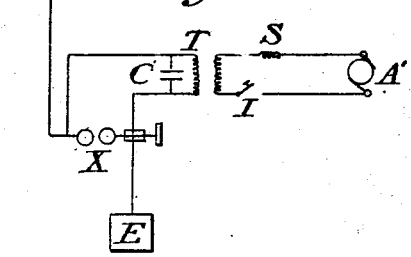

In the accompanying drawings, which form a part of this specification, my invention is illustrated as follows:

Figures 1 and 2 are diagrams illustrating the fundamental idea upon which my invention is based as distinguished from the fundamental idea which underlies the procedures heretofore attempted in wireless telegraphy. Figs. 3 and 4 are diagrams illustrating the equipment of transmitting-stations in accordance with my invention: Figs. 5, 6, 7 and 8 are diagrams illustrating various equipments of receiving-stations with acoustically-tuned receivers in aperiodic receiving-circuits, in accordance with my invention, and Figs. 9 and 10 are diagrams shewing the use of electrically-tuned receiving-circuits in conjunction with either aperiodic or acoustically-tuned receivers in accordance with my invention.

In Fig. 1 the curves $P, Q, V$, indicate electric waves which are produced at the transmitting-station in any ordinary or improved manner, by the charges and discharges of an oscillator of the Hertz type, and which give rise to corresponding electromagnetic waves which proceed from the mast-wire. It will be seen that these waves occur in groups and that each group is composed of a number of waves which become very rapidly enfeebled, the first wave of each group being of comparatively great amplitude and the following waves of each group being rapidly reduced in amplitude by the dampening effects to which they are subjected, so that the periods between the successive discharges of the oscillator comprise intervals in which there are practically no waves emanating from the mast-wire, and these intervals of no oscillation form a large fraction of the period between two successive discharges. At the distant station the electromagnetic waves arrive considerably weakened, but there they do not usually fade out altogether, but fill up the whole interval between the successive discharges. This is indicated in Fig. 1 by the curves $p, q, v$. The wave frequencies are extremely high, going into the millions per second, while the group frequencies, which correspond to the frequencies of the discharges at the transmitting-oscillator, are naturally very much lower.

Prior to my invention it was attempted to tune the mast-wire, at the receiving-station in unison with the wave frequency of one transmitting-station, so as to receive and respond to such frequency and to receive and respond to no other frequency. But in accordance with my invention the receiving mast-wire takes no selective notice of the wave frequency; it receives waves of all frequency, but the receivers respond only to the group frequencies of such waves, making one movement or one vibration in response to each group of waves. This is indicated in the diagram Fig. 2, where $P, Q, V$, again represent the waves corresponding to successive discharges of the transmitting-oscillator, and $p'\ q'\ v'$ represent the corresponding successive vibrations of a receiving apparatus, say, a telephone diagram, or a vibrating reed, tuned to the frequency of the groups $P, Q, V$.

An essential requisite for the practice of my invention is that at the transmitting-stations there be a means for producing electrical discharges of the desired frequency or frequencies, and that the discharges be disruptive, as distinguished from discharges which merge into each other. It is within my invention to use any of the means afforded by the known art to accomplish this result, but I have found the equipment diagrammatically indicated in Figs. 3 and 4 particularly effective.

In Fig. 3 is shown an induction-coil T, in the primary of which is a battery B and any kind of automatic circuit-breaker of definite predetermined periodicity. The conventional device indicated at Z may represent such circuit-breaker, which may be either a rheotome of the kind ordinarily used in connection with Ruhmkorff coils, or it may be an electrolytic circuit-breaker, or a rotary circuit-breaker of any ordinary or improved kind. In this primary circuit there is a key I for closing and opening the circuit. The secondary circuit includes the two oscillator-balls X, set at the proper striking distance, which forms the spark-gap. From one of these oscillator-balls extends the mast-wire A, and from the other the ground connection E. An arrangement of this kind has been found in practice to give rather poor results, since the discharges between the oscillator-balls are not distinctly and sharply disruptive, particularly when the periodicity of the circuit-breaker Z is high. It has been found in such cases that the discharges merge into each other and tend to form and maintain an electric arc. For the purposes of my invention the formation of an arc at the oscillator is inadmissible, and in order to prevent this I place in the secondary circuit a condenser C of suitable capacity, in shunt around the spark-gap. If the interrupter Z is of the electrolytic type its frequency can be adjusted at will by an inductance-coil S of suitable size included in the primary circuit, or by properly choosing the number of cells in series for the battery B. The proper frequency is obtained by observing the rule that an increase of the number of cells in series or the diminution of the impedance of the circuit increases the frequency of the interruption and vice versa.

The arrangement indicated in Fig. 4 is similar to that in Fig. 3, except that in place of the interrupter Z and the battery B, I there use an alternating-current dynamo A'. The induction-coil or transformer T used in this arrangement is so chosen as to give an elevated potential in the secondary circuit, say, anywhere from twenty-five thousand up to one hundred thousand volts. With such high potentials the condenser C, must, of course, be properly constructed so as not to break down under the high pressure. By adjusting the speed and electromotive force of the alternator, the inductance of the primary circuit by the self-inductance coil S, and the capacity of the condenser C in the secondary circuit, the number of discharges at the spark-gap can be adjusted to a nicety. If once the adjustment is made the frequency of discharges at the spark-gap remains invariable.

I am not confined in the practice of my invention to the use of the identical arrangements for producing a definite frequency of discharges at the transmitting-stations; any other well-known or improved means for obtaining this result may be used for this purpose. All that is required is that there be produced at each station a different but fixed number of electrical discharges. The range of frequencies practically available in my system is rather wide and depends largely upon the particular receiving apparatus used in a given case, as will be pointed out further on.

Figure 5:
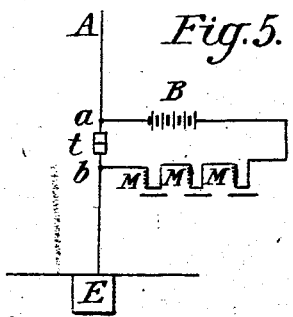

One equipment of a receiving-station is indicated in Fig. 5 where A is the mast-wire, E the ground and $t$ a self-restoring coherer included in the mast-wire. This coherer may be of any of the well-known self-restoring types. In shunt around the coherer $t$ is the receiving-circuit $a$, B, M, $b$, containing the battery B and a number of differently-tuned monotelephones M, M, M, that is to say, telephones adjusted to selectively respond each to a different frequency of electrical impulses. Such monotelephones may be constructed in the manner set forth in United States patent to Mercadier No. 447,194, dated February 24, 1891, or in any other approved manner. I have here shown the monotelephones arranged in series in the local receiving-circuit; but they may just as well be arranged in multiple.

The equipment of the receiving-station shown in Fig. 5, is adapted to work in conjunction either with one of three transmitting-stations such as described with reference to Figs. 3 and 4, or in conjunction with three such stations simultaneously. Suppose three such stations be equipped, and that the frequency of discharges produced at these stations be five hundred, seven hundred and nine hundred, respectively. With such outlying transmitters, the three monotelephones at the receiving-station must be adjusted to respond respectively to five hundred, seven hundred and nine hundred electrical impulses per second; that is to say, while these monotelephones will receive any number of electrical impulses without selection, they will respond audibly only to these frequencies, and will emit musical notes corresponding to these frequencies. If now at the transmitting-station which has the frequency five hundred, the Morse key I, be operated, the mast-wire at that station will emit five hundred groups of electromagnetic waves per second. These groups of electromagnetic waves will be absorbed by the mast-wire of the receiving-station and the resistance of the self-restoring coherer will be varied with the frequency of the waves emitted at the transmitter, but in the manner indicated in Fig. 1 by the groups of waves $p\ q\ v$; that is to say, the resistance of the coherer and consequently of the whole receiving-circuit will be varied a vast number of times, but these variations themselves will periodically decrease and increase five hundred times per second, and variations of current in the receiver-circuit will likewise occur in a decreasing and increasing manner in five hundred groups per second. The single elementary variations of current, which occur at the enormous rate of the wave frequency, cannot effect any of the telephones in the circuit, and even if they could set the telephone-diaphragm into vibration, these telephones could not emit a sound corresponding to that frequency since this rate of vibration is far beyond the limits of audibility. But one of the telephones, being tuned to the rate of five hundred per second, will be acted upon by each group of current variation as by a single impulse, and will vibrate at that rate and emit a corresponding note. The other monotelephones will receive the same current-impulses, but being tuned respectively to seven hundred and nine hundred vibrations per second, they will emit no sound, or practically no sound. The message therefore which is sent from the station which is tuned to five hundred discharges per second will be selectively received and made audible by one of the three monotelephone-receivers at the receiving-station. Similarly, a message sent from the transmitting-station tuned to seven hundred discharges per second will be selectively received by another monotelephone, and a message transmitted from the station which is tuned to nine hundred discharges per second will be selectively received by the third monotelephone. Similarly, if two of the transmitting-stations simultaneously send messages, or if all the three transmitting-stations simultaneously sent messages, they will be selectively received each by one of the monotelephones.

It will be seen that the system is not limited to the use of three receivers, since a much greater number can be installed in the manner described, and each of them will selectively receive a message from one of the suitably-tuned transmitting-stations.

When monotelephones or tuned reeds are used as receivers, and are designed to tell the message by the notes which they emit, the frequency of the discharges at the transmitters must evidently be below the frequency of acoustical vibrations which produce the highest still audible note; nor must the number of discharges at the transmitting-station have a lower periodicity than that which corresponds to acoustical vibrations which give the deepest still audible note.

Figure 6:
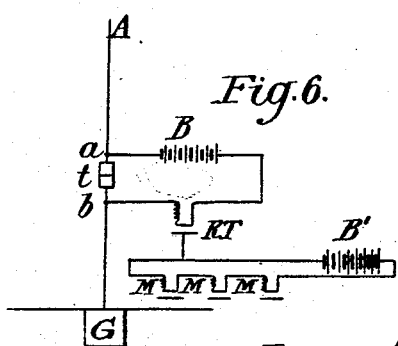

The arrangement shown in Fig. 6 is similar to that shown in Fig. 5, except that the circuit which contains the self-restoring coherer $t$ and the battery B, contains in this case the electromagnet of a microtelephonic relay R T, of any ordinary or improved construction, such, for instance, as that shown in United States patent to Mercadier and Pierquin, No. 622,629, dated April 4, 1899, while the monotelephones M, M, M, are in a local circuit with a battery B' and which local circuit contains the microphonic element of the relay, so that the resistance of that circuit is varied in accordance with the incoming groups of electromagnetic waves which affect the coherer. The microtelephonic relay is, of course, not tuned, since it has to respond, without selection, to all group frequencies to which the monotelephones are tuned. An obvious variation of this arrangement would be to connect the circuit of the coherer with the local circuit containing the monotelephones by an induction-coil, such as is used in ordinary telephony; and in this case the battery B' is of course omitted.

In the arrangement so far described the signals are received as musical notes of shorter and longer duration, separated by intervals of silence in accordance with the manipulation of the key I of the transmitter; and in this manner messages in accordance with the Morse, or any other code, may be spelled out and received. If the Morse key is once depressed, and so long as it is kept depressed, the regularly-timed discharges at the spark-gap take place continuously and a continuous series of groups of electromagnetic waves are transmitted and are received at one of the monotelephones, and the speaking of one such monotelephone would inform the receiving-operator which of the transmitting-stations is now in communication with him, but he would receive no other intelligence. When, however, the transmitting-key is manipulated in accordance with a predetermined code, the Morse code for instance, the correspondingly-tuned monotelephone responds to various numbers of groups of electromagnetic waves with intermissions of silence; in other words, by the conventional manipulation of the transmitting-key the primary groups of electromagnetic waves are assembled into short and long code groups, and the response of the monotelephones to such code groups spells out the message.

Instead of monotelephones other electromagnetic receiving apparatus, such as sounders or Morse recorders, or any other kind of recorders may be used. Such arrangement is illustrated in Fig. 7. In this case the circuit of the self-restoring coherer contains a series of relay-magnets R, R, R, and these act upon vibrating reeds which are differently tuned each in unison with one of the group frequencies of a corresponding number of outlying transmitting-stations. These vibrating reeds are in a local circuit of a battery B', which includes in multiple arc branches the sounders or recorders N N N. Normally the reeds are so adjusted as to keep the multiple arc branches all open; but if one of these reeds is set in vibration in response to a group frequency of electrical vibrations corresponding to the tuning of the reed, then this reed, vibrating with gradually-increasing amplitude, will, eventually close one of the multiple arc branches and thus operate one of the sounders or recorders. In the same manner two sounders or all the sounders, or recorders, may be operated simultaneously; that is to say, two or more messages may be received simultaneously. With this arrangement of receiving apparatus the group frequency, that is to say, the frequency of discharges at the transmitter, may be much smaller than in the case of monotelephone-receivers or in the case of any other kind of acoustical receivers, since the relay-reeds need not emit a musical note. It is therefore all sufficient if the number of discharges at the transmitter is sufficiently great to surely comprise one or two such discharges during the shortest closure of the transmitting-key. The destructive effects of sparks at the circuit-controlling reeds may be obviated in the usual manner by spark-shunting condensers, as is the practice with rheotomes in Rhumkorff coils.

The arrangement illustrated in Fig. 8 is similar to that shown in Fig. 7, except that in this case the circuit of the self-restoring coherer contains an electromagnet of a microtelephonic relay R T, the microphonic element of this relay being in a separate local circuit of a battery B'', which contains in series the magnets of the relays R R R. The tuned reeds of these relays are in operative relation to their respective magnets and are in the local receiver-circuit of the battery B' containing the sounders or recorders N in normally open multiple branches, the same as in the apparatus shown in Fig. 7. Here again, it will be understood that the microtelephonic relay is not tuned, since it has to respond to all group frequencies designed for reception at this station.

It will be seen from the foregoing that by the method so far described no electrical selection of waves or groups of waves is practiced and that the energies of the electromagnetic waves absorbed at the receiving-station are transferred in the form of corresponding electrical impulses to the receiving-circuits without selection, no matter what the frequencies of the waves or the group frequencies of these waves may be; but the energies thus transferred to the receiving-circuit selectively actuate the signal-receiving devices each with one of the group frequencies of the absorbed waves, either directly, as with the arrangement shown in Fig. 5, or indirectly through the intermediary of relays, as with the arrangements shown in Figs. 6, 7 and 8. The selection, therefore, is purely mechanical. But while the results obtained by purely mechanical selection are in most cases all that is required, the same results may be obtained by purely electrical selection, or better results may be obtained by combining electrical and mechanical selection; and these modified methods may be practiced with the apparatus indicated in Figs. 9 and 10.

In Fig. 9, the mast-wire A, grounded at G, and the self-restoring coherer $t$, are arranged as usual. The coherer is shunted at the points $a$ $b$ by two circuits, one containing the battery B, the inductance-coil $s$, the relay-magnet R, and the condenser $c$, in shunt; and the other containing the battery B', the inductance-coil $s'$, the monotelephone M, and the condenser $c'$ in shunt. These two circuits are only specimens, since more than two such circuits, or only one such circuit may be thrown around the coherer. These branch circuits are tuned each to a different group frequency, by the condensers and inductance-coils. As here shown the relay-magnet R in one of these branch circuits controls a vibrating reed tuned in union with the circuit of its controlling-magnet and itself controlling the local circuit of the battery B² containing any suitable electromagnetic receiver N, such as a sounder or recorder; while the other branch circuit operates the telephone M, which may be an ordinary telephone, but is preferably a monotelephone tuned in unison with the branch circuit which controls it. With this arrangement the energies of the electromagnetic waves absorbed at the station are transferred in selected groups of different frequencies to the receiving-circuits that are branched around the coherer, the selection so far being electrical; and these selected energy groups actuate a signal-receiving device either directly as in the case of the circuit containing the telephone M, or indirectly as in the case of the circuit containing the receiver N, through the intermediary of a relay. If an ordinary telephone is employed, the selection remains purely electrical, but if a tuned monotelephone is employed, or where the tuned relay is employed, the selection becomes electromechanical, which gives the best results.

In Fig. 10, the mast-wire does not contain the coherer, but contains the primary of a transformer $j$, the secondary of which is in a local circuit containing the coherer $t$ and a condenser $c'$ in shunt, and this condenser has such capacity as to tune this secondary circuit in unison with the wave frequency employed at the transmitting-station in conjunction with which it is designed to work. Around the coherer $t$ is thrown a branch circuit containing a battery B, a relay-magnet R, an inductance-coil $s$, and a condenser $c$ in shunt. This branch circuit is tuned to the group frequency employed at the transmitting-station in conjunction with which it is designed to work, and the relay-magnet R controls a vibrating reed tuned to this group frequency and controlling the local circuit of the battery B' containing the sounder or recorder N. With this arrangement the primary of the inductorium $j$, which through the mast-wire receives, without selection, the waves of all frequencies employed at several transmitting-stations, transfers selectively to the tuned secondary circuit only the waves having the frequency employed at one of the transmitting-stations, varying the resistance of the coherer at this rate, but the branch thrown around the coherer and which contains the battery B being tuned to the group frequency of the aforesaid transmitting-station will receive electrical variations only at that frequency, and will therefore act upon the reed of the relay R only at that rate, that is to say, at the same rate to which the reed itself is tuned. In this manner the selectivity of the reed becomes more pronounced, as will be readily understood. Of course, more than one branch may be thrown around the coherer, as is shown in Fig. 9. The selectivity practiced in this manner is very high, for in the first instance a wave frequency is electrically selected by and the energy thereof transferred to the secondary circuit of the transformer but without selection of groups; then an energy group of a different frequency is electrically selected by each shunt around the coherer, and these energy groups actuate or control signal-receiving devices, each at the rate of a selected-group frequency. It will also be readily understood that in all receiving-stations like those shown in Figs. 5, 6, 7 and 8, the coherer can be taken from the mast-wire and placed in an independent local circuit which is only inductively connected with the mast-wire by a transformer in the manner indicated in Fig. 10.

From the foregoing description it will be seen that my invention comprises certain apparatus in addition to the methods of operation which I have herein set forth; these apparatuses, however, I do not herein claim, since the same are claimed in Patent No. 783,923, granted to me on February 28, 1905, upon my application, Serial No. 38,539, filed December 3, 1900, and of which this is a division, and in my Patent No. 783,992, granted on February 28, 1905, upon my application, Serial No. 164,580, filed July 7, 1903, as a division of the aforesaid application, Serial No. 38,539.

What I claim, and desire to secure by Letters Patent, is—

1. The method of wireless telegraphy which consists in producing at one or more transmitting-stations electromagnetic waves in groups of different predetermined frequencies and actuating at one or more receiving-stations signal-receiving instruments each selectively with one of the different transmitted group frequencies, substantially as described.

2. The method of wireless telegraphy consisting of producing electromagnetic waves at one or more transmitting-stations in groups of different predetermined frequencies electrically selecting the energies of the groups of different frequencies each separately and actuating signal-receiving devices, each by a different group frequency, substantially as described.

3. The method of wireless telegraphy which consists in producing electromagnetic waves at one or more transmitting-stations in groups of different predetermined frequencies, electrically selecting the energy corresponding to each group frequency separately, and selectively actuating by the energy corresponding to each selected group frequency a signal-receiving device, substantially as described.

4. The method of wireless telegraphy which consists in producing at one or more transmitting-stations electromagnetic waves of a predetermined frequency in groups of predetermined and different frequencies, electrically selecting at a receiving-station the energies of the transmitted waves of a selected frequency, selectively transferring the energies of the differently-timed groups of these waves each to a different circuit, and causing the energy groups to actuate or control signal-receiving devices, each at the rate of one of the selected groups, substantially as described.

5. The method of selectively receiving a wireless-telegraph message transmitted in the form of electromagnetic waves in code groups composed of groups of a predetermined frequency, which consists in mechanically selecting the group energies of the transmitted waves and actuating thereby a signal-receiving device in accordance with the code groups, substantially as described.

6. The method of receiving wireless-telegraph messages transmitted in the form of electromagnetic waves in groups of different frequencies, which consists in electrically and mechanically selecting the energies of the groups of different frequencies each separately and actuating signal-receiving devices each by and in accordance with a different group frequency.

7. The method of receiving a number of wireless-telegraph messages transmitted by electromagnetic waves of predetermined frequency in groups of a like number of different predetermined frequencies, which consists in electrically selecting the energies of the wave and group frequencies and mechanically selecting the energies of the different group frequencies each by a separate signal-receiving device, substantially as described.

In testimony whereof I have signed my name to this specification in the presence of two subscribing witnesses.

ANDRÉ BLONDEL.

Witnesses:
JAETAN DOBKEVITCH,
JOSEPHINE CORNET.